April 5, 1938.   J. L. PERKINS   2,112,996
MACHINE FOR FORMING GEARS
Filed Sept. 12, 1935

INVENTOR,
Julian L. Perkins,
BY
Walter C. Ross.
ATTORNEY.

Patented Apr. 5, 1938

2,112,996

UNITED STATES PATENT OFFICE 2,112,996

MACHINE FOR FORMING GEARS

Julian L. Perkins, West Springfield, Mass.

Application September 12, 1935, Serial No. 40,305

1 Claim. (Cl. 29—90)

This invention relates to improvements in gears and methods of and apparatus for making the same.

The principal objects of the invention are directed to the provision of a novel gear and distinctive method of making the same. According to special features of the invention a gear is first formed to have teeth and then the teeth are formed or shaped by means of a tooth-forming gear or gears while subjected to pressure.

As is well-known, gears are formed by cutting the teeth of gear blanks and by forging gears with the teeth therein and afterwards finishing cutting them. Such operations are not only costly, but these cutting operations consume time and labor and expensive dies are required with forged gears. Gears which are cast with the teeth thereon are not satisfactory unless the teeth are finished by a cutting operation.

Present day demands call for inexpensive gears which must have properly formed teeth. To accomplish this according to the present invention a gear having teeth is cast or forged and the teeth are brought to final shape by a forming gear or gears in such a way as to properly shape or accurately form the teeth. In this way an inexpensive cast or forged gear is transformed into a gear having correctly shaped teeth which are equal in all important respects to the more expensive cut or forged teeth.

Various other novel features and advantages of the invention will be more fully hereinafter referred to in connection with the accompanying description of the preferred form of the invention, reference being had to the accompanying drawing wherein.

Figure 1:
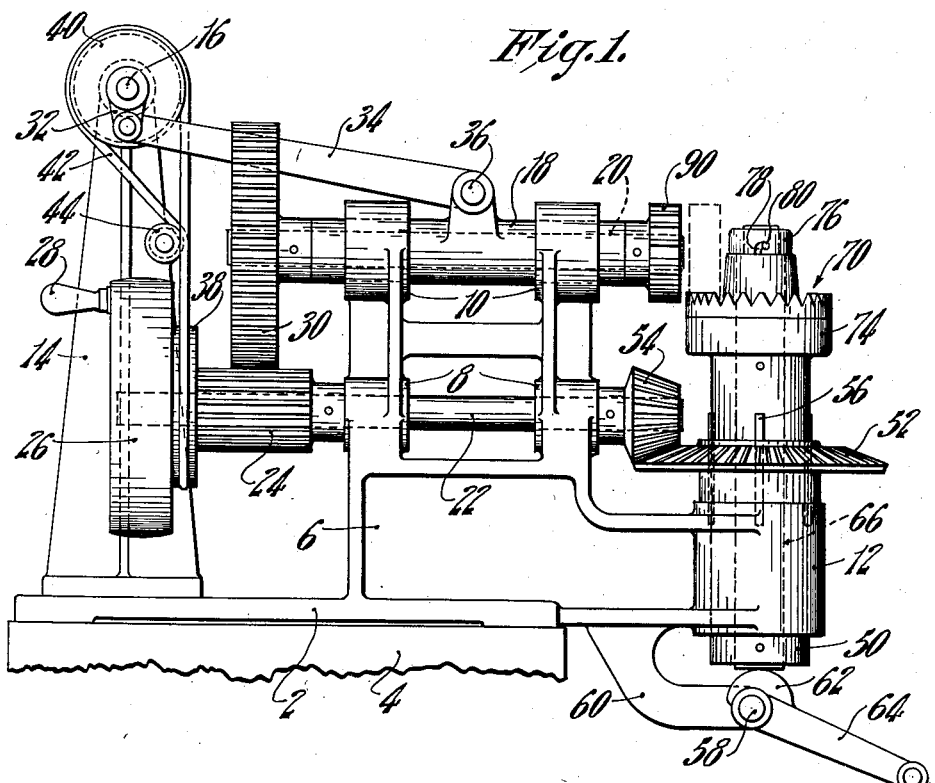
Fig. 1 is an elevational view of an apparatus embodying the novel features of the invention.

Referring now to the drawing more in detail, the apparatus of the invention will be fully described and in connection with which the novel method will be referred to.

A base 2 is provided for securing to a bench 4 or the like. An upstanding support portion 6 is provided with lower aligned bearings 8 and upper bearings 10 thereabove. A vertically disposed bearing 12 is also associated with the part 6 and a bearing bracket 14 extends upwardly from the base 2. The bracket 14 has a shaft 16 rotatable therein.

A sleeve 18 is reciprocable in the bearings 10 and a shaft 20 is rotatable in said sleeve. A shaft 22 is provided and this is rotatable in the lower bearings 8. The shaft 22 carries upon its left hand end a driving member in the form of a pinion 24 and means to rotate the shaft 22 is provided. This may take the form of a pulley 26 which may be belted to any suitable source of power and a handle 28 may project therefrom.

The upper shaft 20 has a gear 30 in mesh with the driving member 24 wherefor the shaft 20 is rotated by rotation of the shaft 22 and while in rotation said shaft is reciprocated back and forth by reciprocation of the sleeve 18. A crank 32 on shaft 16 is connected to one end of a link 34 which has its other end connected at 36 to the sleeve 18.

Pulleys 38 and 40 are provided on the shafts 22 and 16 respectively and they have an endless belt 42 therearound which passes over an idler 44. As the shaft 22 is rotated, the shaft 16 is rotated by means of the belt and pulleys so that the sleeve is reciprocated while shaft 20 therein is rotated.

A vertically disposed shaft 50 is reciprocable and rotatable in the bearing 12 and a driven gear 52 through which the shaft 50 reciprocates is in engagement with a driving gear 54 on the shaft 22. The shaft 50, while it may reciprocate in the bearing 12 and gear 52, is rotated by the gear 52 through a spline or splines and key or keys indicated by 56. A shaft 58 oscillatable in an arm 60 carries an elevating member in the form of a cam 62 with which is associated a handle 64. A central shaft 66 is preferably rigidly fixed to the arm 60 and this is arranged to bear on the member 62. The cam 62 is arranged to elevate the shaft 50 to exert pressure during the tooth-forming or finishing operation.

Figure 3:
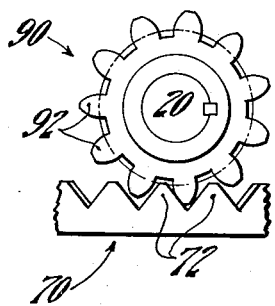
Fig. 3 is a side elevational view of a part of the gear shown in Fig. 2 with a forming gear in association therewith.
Figure 2:
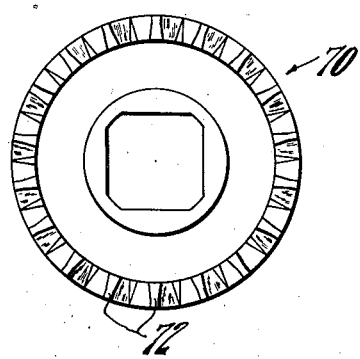
Fig. 2 is a plan view of a gear forming a part of the invention.

One form of gear with which the invention is concerned is a face gear 70 such as is shown in Fig. 2 and having teeth 72 projecting upwardly as shown in Fig. 3. This gear may be forged or cast with the teeth thereon and may be called a preformed gear. It is to finish or shape the teeth that the invention relates.

The gear 70 is slipped over the shaft 66 so that it rests on a collar 74 and it is held in place thereon by a retaining collar 76 having a slot 78 more or less angularly disposed. This slot is adapted to receive a pin 80 of shaft 66.

The means for acting on and for shaping or finishing the forming of the teeth of the gear which are preformed by a casting or forging operation, preferably takes the form of a forming gear represented by 90. Such a gear is fixed to the end of shaft 20. For best results the teeth 92 of this gear 90 are substantially like the teeth of the gear or pinion with which the gear 70 when finished will operate.

In the form of the invention shown in Fig. 3, which has been found to operate exceptionally well, the pinion has eleven teeth and to obtain the desired results the addenda of the teeth 92 are relatively longer than those of standard teeth of the same pitch. This is illustrated in Fig. 3 wherein it will be seen that the pitch line $p$ is at a somewhat greater distance from the ends of the teeth than is the case in standard teeth. That is to say, the teeth of the forming gear have a longer addenda with relation to the dedenda than is the case with standard teeth.

With the gear 70 in place on the shaft 66 and the forming gear 90 fixed in some suitable manner to the shaft 20, the shaft 22 is rotated as is the shaft 20 which is also reciprocated by reciprocation of the sleeve 18. This causes the forming gear to roll its teeth in mesh with the teeth of the gear 70 and by manipulating the handle 64 pressure may be applied to press the teeth together. The combined rolling and pressure brings about the desired forming, shaping and/or finishing of the teeth of gear 70 in an efficient and economical manner.

The gears 24 and 30 and the gears 52 and 54 are of such relative pitch diameters that the shafts 20 and 50 are rotated relative to one another in such a way that the forming gear and gear 70 are rolled in meshing engagement in the desired manner. If desired the shaft 22 may be oscillated instead of rotated so as to oscillate the shaft 20 as in some cases it may be desirable to oscillate the forming gear 90 and gear 70 back and forth rather than to make the same rotate.

From the foregoing it will be observed that it is possible to economically and efficiently produce gears of the type shown and described. By casting or forging gears with the teeth thereon, the teeth may be made very close to the desired finished size and shape, but heretofore it has been necessary to finish them by cutting and/or grinding operations which are costly. According to this invention cutting and other costly operations are not only entirely dispensed with but the finished teeth by the method and apparatus of this invention, are given their final form and shape and size by the means of pressure and rolling action. This insures that the teeth have a more correct contour than has been possible heretofore so that the finished gear fits more correctly the gear with which it operates. Because the member 18 reciprocates it is possible to simultaneously move the forming member back and forth across the teeth of the gear 70 with which the teeth are in rolling engagement and subjected to pressure.

The face gear shown has teeth disposed peripherally with their ends arranged radially so as to be capable of meshing with a spur gear having its axis disposed transversely to that of the face gear. The forming gear 90 and its position relative to the face gear is like that of the gear to be meshed with the face gear.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

A machine for finishing the teeth of a gear comprising, a vertically disposed reciprocable and rotatable shaft for supporting a face gear, a horizontally disposed reciprocable and rotatable shaft, a forming gear rotatable therewith having teeth for acting on the teeth of a face gear, means to rotate said shafts relative to one another whereby the teeth of the forming gear and those of a face gear are relatively rolled, pressure means to reciprocate the first-named shaft, and means to reciprocate the second-named shaft.

JULIAN L. PERKINS.